(12) United States Patent
Underwood et al.

(10) Patent No.: US 6,380,719 B2
(45) Date of Patent: Apr. 30, 2002

(54) INTEGRATED CONTROL SYSTEM AND METHOD FOR CONTROLLING MODE, SYNCHRONIZATION, POWER FACTOR, AND UTILITY OUTAGE RIDE-THROUGH FOR MICROPOWER GENERATION SYSTEMS

(75) Inventors: Thomas C. Underwood, Laurel; William B. Hall, Annapolis, both of MD (US); Thomas C. Matty, North Huntingdon, PA (US)

(73) Assignee: SatCon Technology Corporation, Cambridge, MA (US)

( * ) Notice: Subject to any disclaimer, the term of this patent is extended or adjusted under 35 U.S.C. 154(b) by 0 days.

(21) Appl. No.: 09/900,849

(22) Filed: Jul. 3, 2001

Related U.S. Application Data (62) Division of application No. 09/535,541, filed on Mar. 27, 2000, which is a division of application No. 09/140,391, filed on Aug. 26, 1998, now Pat. No. 6,072,302.

(51) Int. Cl.$^7$ ................................................ H02P 9/04
(52) U.S. Cl. ............................ 322/36; 322/20; 322/37; 322/8; 307/85
(58) Field of Search .......................... 322/7, 8, 17, 20, 322/28, 36, 37; 307/85, 86, 87

(56) References Cited

U.S. PATENT DOCUMENTS

| | | | |
|---|---|---|---|
| 3,794,846 A | 2/1974 | Schlicher et al. | 307/87 |
| 4,376,295 A | 3/1983 | Uenosono et al. | 361/21 |
| 4,492,874 A | 1/1985 | Near | 290/40 B |
| 4,973,896 A | 11/1990 | Shiga et al. | 322/28 |
| 5,225,712 A | 7/1993 | Erdman | 290/44 |
| 5,483,435 A | 1/1996 | Uchino | 363/81 |
| 5,559,421 A | 9/1996 | Miyakawa | 322/58 |
| 5,606,244 A | 2/1997 | Migdal | 322/7 |
| 5,642,006 A | 6/1997 | Cech | 307/87 |
| 5,663,627 A | 9/1997 | Ogawa | 318/803 |
| 5,733,955 A | 3/1998 | Schulz et al. | 524/69 |
| 5,761,073 A | 6/1998 | Dickson | 364/484 |
| 6,014,015 A * | 1/2000 | Thorne et al. | 322/15 |
| 6,072,302 A * | 6/2000 | Underwood et al. | 322/17 |
| 6,104,171 A | 8/2000 | Dvorsky et al. | 322/8 |
| 6,118,187 A | 9/2000 | Hepner et al. | 290/40 B |
| 6,316,918 B1 * | 11/2001 | Underwood et al. | 322/20 |

* cited by examiner

*Primary Examiner*—Nicholas Ponomarenko
(74) *Attorney, Agent, or Firm*—Dike, Bronstein, Roberts & Cushman, IP Group; George W. Neuner; George W. Hartnell, III (57) ABSTRACT

An integrated system for comprehensive control of an electric power generation system utilizes state machine control having particularly defined control states and permitted control state transitions. In this way, accurate, dependable and safe control of the electric power generation system is provided. Several of these control states may be utilized in conjunction with a utility outage ride-through technique that compensates for a utility outage by predictably controlling the system to bring the system off-line and to bring the system back on-line when the utility returns. Furthermore, a line synchronization technique synchronizes the generated power with the power on the grid when coming back on-line. The line synchronization technique limits the rate of synchronization to permit undesired transient voltages. The line synchronization technique operates in either a stand-alone mode wherein the line frequency is synthesized or in a connected mode which sensed the grid frequency and synchronizes the generated power to this senses grid frequency. The system also includes power factor control via the line synchronization technique or via an alternative power factor control technique. The result is an integrated system providing a high degree of control for an electric power generation system.

8 Claims, 10 Drawing Sheets

INTEGRATED CONTROL SYSTEM AND METHOD FOR CONTROLLING MODE, SYNCHRONIZATION, POWER FACTOR, AND UTILITY OUTAGE RIDE-THROUGH FOR MICROPOWER GENERATION SYSTEMS

CROSS-REFERENCE TO RELATED APPLICATIONS

This application is a divisional of co-pending U.S. application Ser. No. 09/535,541 filed Mar. 27, 2000, the teachings of which are incorporated herein by reference, which is a divisional of U.S. application Ser. No. 09/140,391 filed Aug. 26, 1998 now U.S. Pat. No. 6,072,302, the teachings of which also are incorporated herein by reference.

BACKGROUND OF THE INVENTION

1. Technical Field of the Invention

This invention relates to control systems and methods for controlling inverter based electrical power generation and feeding of generated power to a grid. This invention particularly relates to an integrated control system and method that integrates a variety of power control functions including state machine control of distinct operational modes, synronization with the grid, power factor control and utility outage ride-through.

2. Description of Related Art

Various control devices for controlling inverter based electrical power generation are known in the art. Typical controllers utilize analog voltage or current reference signals, synchronized with the grid to control the generated wave form being fed to the grid. Such controllers, however, lack distinct control states and the capability of controlling transitions between specifically defined control states.

Various techniques for synchronizing the frequency of generated power to the frequency of a grid-are also known in the art. Such conventional line synchronizers typically sense the line frequency of the grid and lock to the grid when the generated frequency drifts into synchronization.

Such conventional line synchronizers, however, do not have the ability to control the rate of phase shift of the generated power or the ability to interface easily with both 50 Hz and 60 Hz grids.

Various techniques for controlling the power factor are also known in the art. In the context of electrical power generation, for example, Erdman, U.S. Pat. No. 5,225,712, issued Jul. 6, 1993, discloses a variable wind speed turbine electrical power generator having power factor control. The inverter can control reactive power output as a power factor angle or directly as a number of VARs independent of the real power. To control the reactive power, Erdman utilizes a voltage waveform as a reference to form a current control waveform for each output phase. The current control waveform for each phase is applied to a current regulator which regulates the drive current that controls the currents for each phase of the inverter.

Although the conventional art may individually provide some of these features, the combination of these features particularly when utilized in conjunction with an integrated system utilizing state machine control is not found in the art.

Other applications distinct from electrical power generation also utilize power factor control devices. For example, Hall, U.S. Pat. No. 5,773,955 issued Jun. 30, 1998, discloses a battery charger apparatus that controls the power factor by vector control techniques. The control loop utilized by Hall controls power delivery to the battery to obtain a desired charge profile by individually controlling the real and reactive components of the AC input current. The AC input current is forced to follow a reference that is generated in response to information received by the battery charge control circuit to supply the desired charging current to and remove discharge current from a battery.

SUMMARY AND OBJECTS OF THE INVENTION

An object of the invention is to provide an integrated system for controlling all aspects of inverter based electrical power generation and feeding of generated power to a grid. Another object of the invention is to provide a state machine having a plurality of defined control states for electric power transformation including a state controller that controls permitted transitions between the defined control states.

Another object of the invention is to provide a line synchronization technique that is highly flexible and permits synchronization with either a 50 Hz or 60 Hz grid as well as providing smooth transitioning from a stand-alone mode to a grid-connected mode.

A further object of the invention is to provide a line synchronization technique that can either sense the grid frequency or synthesize a frequency for electrical power generation.

Still another object of the invention is to control the re-synchronization rate to provide the smooth transition from stand-alone mode to a grid-connected mode.

A further object of the invention is to provide a method of controlling an electrical power generator during a utility outage.

Yet another object of the invention is to integrate the inventive method of utility outage ride-through with various other control techniques to provide an integrated system.

Still another object of the invention is to provide power factor control over generated electrical power wherein a simple DC control signal having two components commanding the real and reactive components of the generated power may be utilized to control the power factor.

The objects of the invention are achieved by providing a state machine having a plurality of control states for electric power transformation including an initialization state, a first neutral state, a pre-charge state, a second neutral state, an engine start state, a power on-line state, a power off-line state, and a shut down state wherein the state controller controls state transitions such that only permitted transitions between control states are allowed to occur. In this way, a high degree of control can be achieved for electrical power generating and feeding of electrical power to a grid. In this way, the safety and reliability of the system can be ensured.

The objects of the invention are further achieved by a method of controlling real and reactive power developed by a main inverter in an electrical power generation control device including the steps of sampling the three-phase currents output from the inverter, transforming the sampled three-phase current data to two-phase current data, transforming the two-phase current data to a rotating reference frame, controlling an output voltage according to a comparison result between a DC reference signal having real and reactive reference signal components, transforming the output voltage to a stationary reference frame, transforming the stationary reference frame output voltage to a three-phase reference signal, and controlling the inverter based on the three-phase reference signal. By utilizing such a control method, the DC reference signal can be input by an operator or a utility feeding the grid to thereby designate the real and reactive power output by the controlled inverter.

The objects of the invention are further achieved by providing a line frequency synchronization apparatus and method that utilizes a frequency sensor that samples the frequency of the grid or a synthesizer that synthesizes a grid frequency. In the case of sampled grid frequency, the frequency sensor signal is converted by an A/D converter that is controlled by initiating the conversion and reading of the digital value at a fixed frequency. This fixed frequency establishes the time base for which the invention can compute the actual frequency of the signal. This is further accomplished by determining when the falling or rising edge of the signal occurs and counting the number of samples therebetween.

In this way, a synchronization error signal is generated that can be utilized to bring the generated power into synchronization with a grid or the synthesized grid frequency. Furthermore, the synchronization shift rate is preferably limited in order to provide a smooth transition.

The objects of the invention are further achieved by providing a utility outage ride-through method and apparatus that detects a fault condition indicating that the electrical power generation device should be disconnected from the grid, opens a contactor that connects the device to the grid, clears a time counter, sets a mode to an off-line mode, commands the inverter within the device to perform off-line voltage control, and waits for a predetermined time period after all fault conditions have been cleared before setting the mode to an on-line current control mode, enabling the inverter and thereafter closing the contactor to reestablish the connection to the grid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
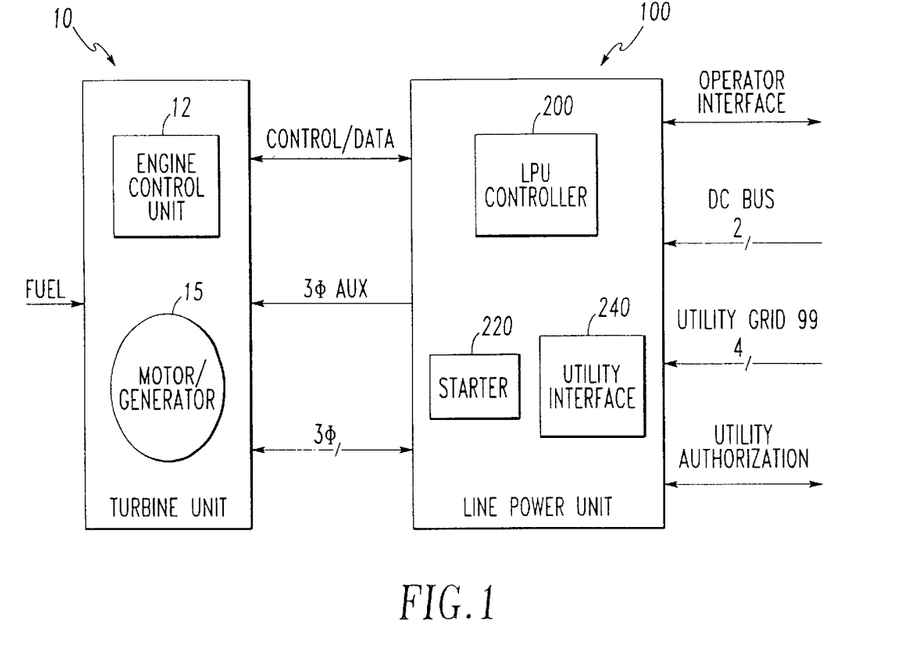
FIG. 1 is a high-level block diagram illustrating the major components of a microturbine generator system that may be controlled according to the invention.

FIG. 1 illustrates the major components of a line-power unit 100 containing the inventive control devices and methods and the overall relationship to a microturbine generator. As shown, the microturbine generator system includes two major components: the turbine unit 10 and the line-power unit 100 may be arranged as shown in FIG. 1.

The turbine unit 10 includes a motor/generator 15 and an engine control unit 12. The turbine unit 10 is supplied with fuel. For example, the motor/generator 15 may be constructed with an Allied Signal Turbo Generator™ which includes a turbine wheel, compressor, impeller and permanent magnet generator which are all mounted on a common shaft. This common shaft is supported by an air bearing which has a relatively high initial drag until a cushion of air is developed at which point the air bearing is nearly frictionless.

The motor (engine) in the motor/generator 15 is controlled by the engine control unit 12 which, for example, throttles the engine according to the demand placed upon the generator. Communication is provided between the turbine unit 10 and the line power unit 100 as shown by the control/data line connecting these units in FIG. 1. This data includes operating data such as turbine speed, temperature etc. as well as faults, status and turbine output.

The motor/generator 15 supplies three-phase (3φ) electrical power to the line power unit 100 as further shown in FIG. 1. The line power unit 100 also supplies three-phase auxiliary power (3φ Aux) to the turbine unit 10.

The line power unit 100 contains three basic components. The line power unit controller 200, starter 220 and utility interface 240 are all included within line power unit 100. Furthermore, an operator interface that permits an operator to monitor and control the line power unit is further provided. The operator interface may include a front panel display for displaying critical operating data as well as controls such as a shut down switch and power level command input as further described below.

A DC bus supplies DC power to the line power unit 100 to permit off-grid starting of the turbine unit. Furthermore, the utility interface 240 supplies three-phase electrical power to the utility grid 99 as well as an optional neutral line. The line power unit 100 also receives utility authorization from a utility company which authorizes connection to the grid 99.

Figure 2:
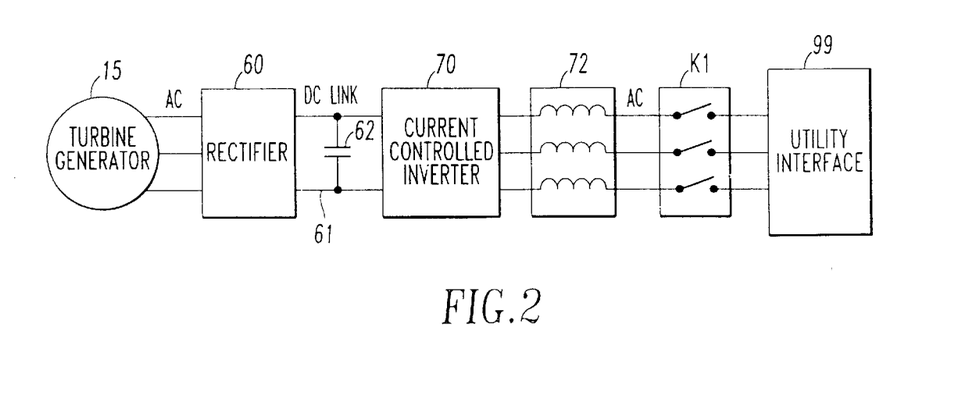
FIG. 2 is a high-level block diagram of a small grid-connected generation facility which is another example of a generation facility that may be controlled according to the invention.

FIG. 2 illustrates a small grid-connected generation facility showing some of the details of the components controlled by this invention. More particularly, a turbine generator 15 generates AC power that is supplied to rectifier 60. The AC power is then converted into DC power by rectifier 60 and supplied to DC link consisting of DC bus 61 and capacitor 62 connected across DC bus 61.

An inverter 70 transforms the DC voltage on the DC link into a three-phase AC waveform that is filtered by inductor 72 and then supplied to the utility 99 via contactor K1.

As further discussed below in relation to FIG. 3, the invention controls the inverter 70 and contactor K1 as well as other components. FIG. 2 is actually a simplified diagram illustrating the necessary components for utility outage ride-through. Other components illustrated in FIGS. 3 and 4 are necessary for other types of control exercised by the invention such as power factor and synchronization.

Figure 3:
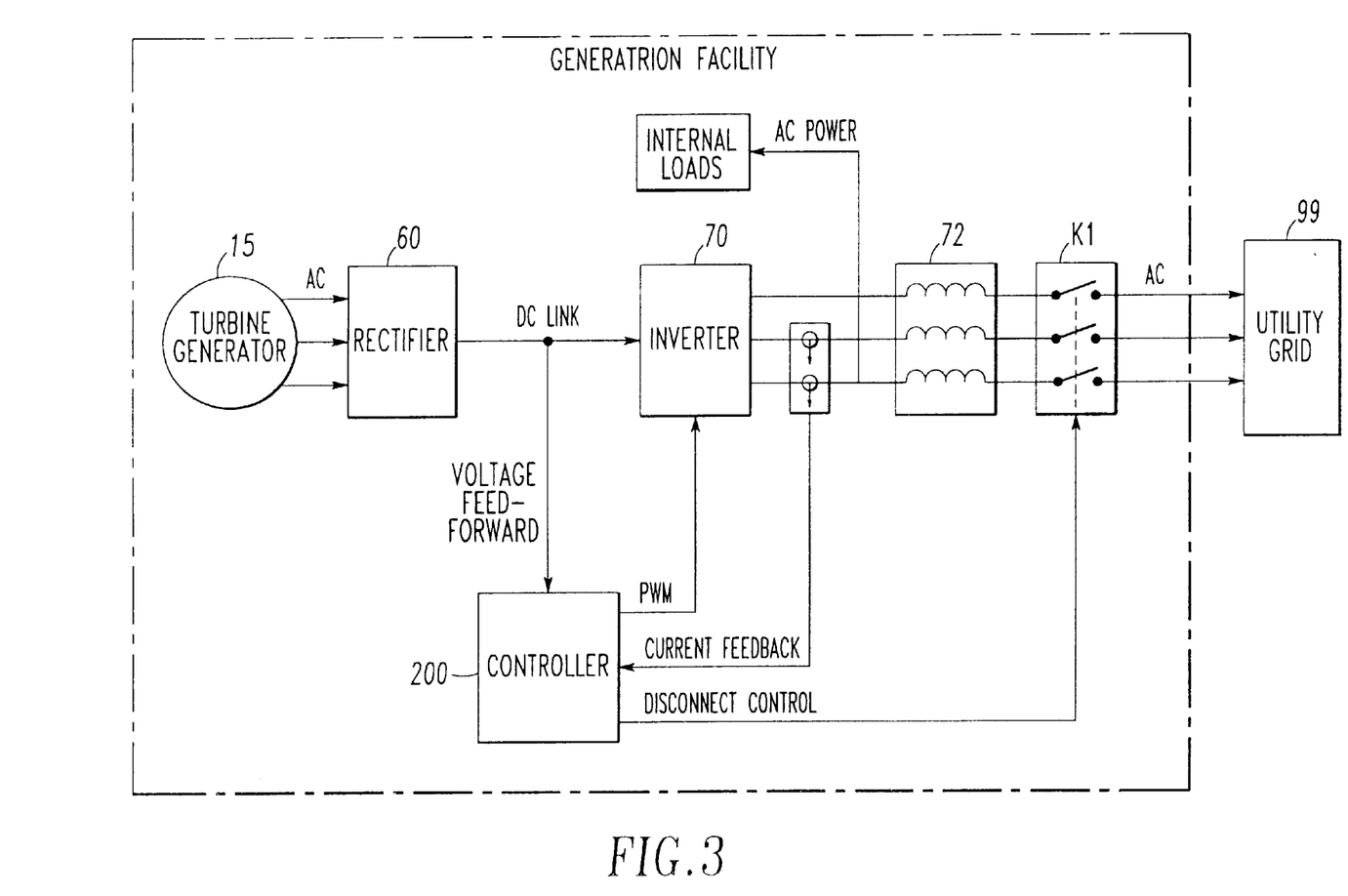
FIG. 3 is a system block diagram of an electrical power generator according to the invention illustrating major components, data signals and control signals.
Figure 4:
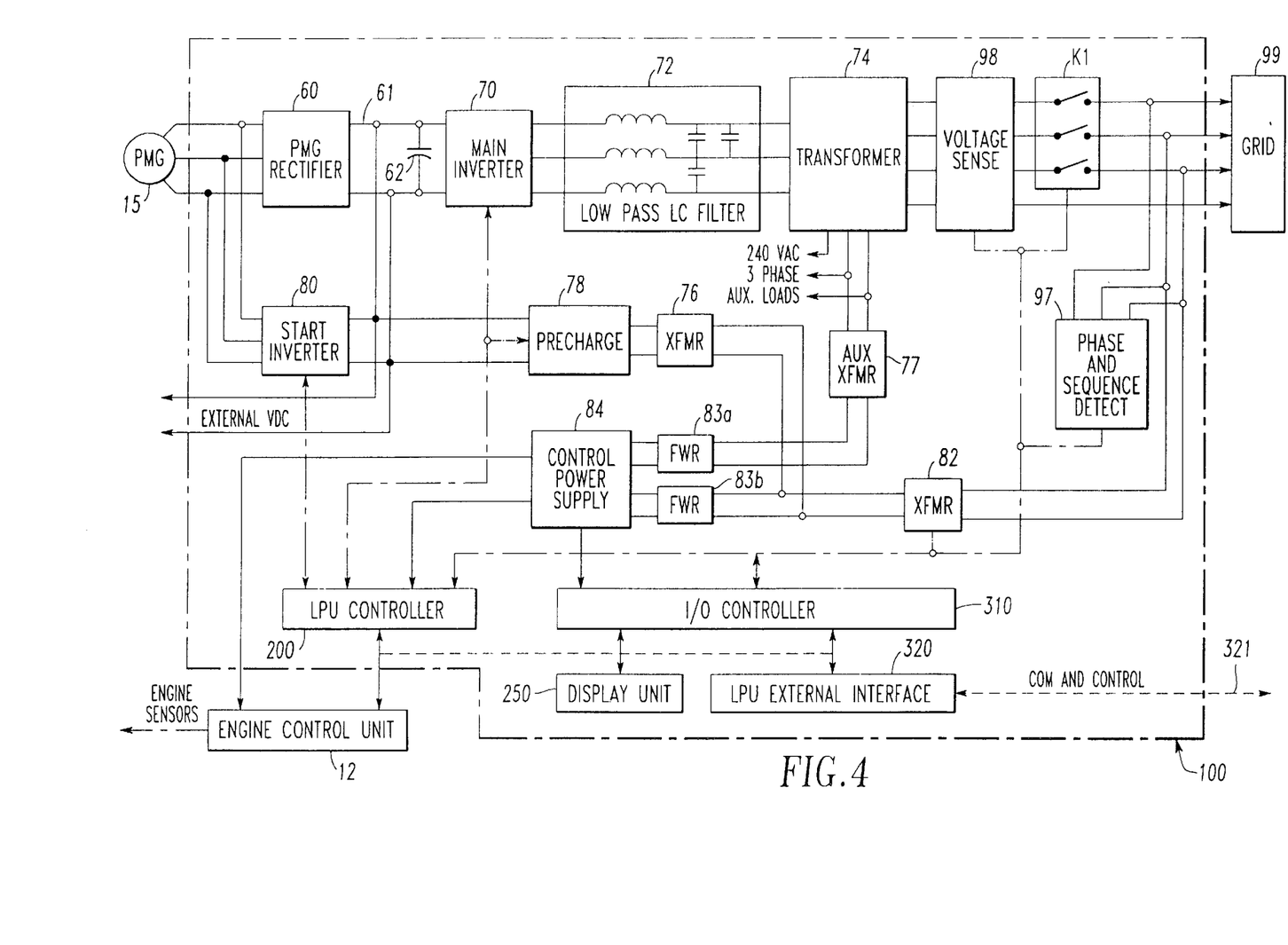
FIG. 4 is a detailed circuit diagram of a line power unit that may be controlled according to the invention.

FIG. 3 is a system block diagram illustrating a generation facility that may be controlled according to the invention. The generation facility includes a turbine generator 15 generating AC power supplied to rectifier 60. This AC power is converted by rectifier 60 into DC voltage supplied to the DC link. This DC link may have the same construction as shown in FIG. 2. The inverter 70 transforms DC power from the DC link into three-phase AC power that is fed to the grid 99 via inductor unit 72 and contactor K1. Power may also be supplied directly to the internal loads via a connection to the output of the inverter 70.

The controller 200 receives a sensed voltage from the DC link as well as the output AC current from the inverter 70 as inputs thereto. The controller 200 utilizes these inputs to generate control signals for the inverter 70. More particularly, the inverter 70 is controlled by pulse width modulated (PWM) control signals generated by controller 200 to output the desired AC waveform. When the generation facility is online, the controller 200 performs feedback current control by utilizing feedback current supplied by a current sensor located at an output side the inverter 70. When the generation facility is offline, however, the control exercised by the controller 200 changes. Specifically, the controller 200 performs feedforward voltage control by utilizing feedforward voltage supplied by a voltage sensor located at an input side of the inverter 70. These current and voltage sensors for feedback current control and feedforward voltage control, respectively may be part of the inverter 70 or separate therefrom as shown in FIG. 3.

The controller 200 also outputs a disconnect control signal to contactor K1 to control the connection of the generation facility to the utility grid 99. Further details of the control method implemented by controller 200 are described below.

FIG. 4 illustrates the details of a line power unit 100 according to the invention. This line power unit (LPU) 100 includes an LPU controller 200 that may be programmed according to the techniques disclosed herein. FIG. 4 is a particularly advantageous embodiment of a line power unit 100 that may be controlled according to the invention.

FIG. 4 shows the details of the inventive line power unit 100 and its connections to the permanent magnet generator 15, engine control unit 12 and utility grid 99. The starter unit 220 is generally comprised of start inverter 80, precharge circuit 78, transformer 76, and transformer 82. The utility interface generally includes the main inverter 70, low pass filter 72, transformer 74, voltage sensor 98, and contactor K1. The LPU controller 200 generally includes phase and sequence detector circuit 97, transformer 82, full wave rectifier 83b, full wave rectifier 83a, control power supply 84 and LPU controller 200. Correspondence between the general construction shown in FIG. 1 and the detailed embodiment shown in FIG. 4 is not important. This description is merely for the purpose of orienting one of ordinary skill to the inventive system.

Turning to the details of the line power unit 100 construction, the permanent magnet generator 15 has all three phases connected to PMG rectifier 60. A DC bus 61 interconnects PMG rectifier 60 and main inverter 70. A capacitor 62 is connected across the DC bus 61.

The output of the main inverter 70 is connected to transformer 74 via low pass LC filter 72. A voltage sense circuit 98 is connected to the output of the transformer 74 and supplies sensed voltages to the LPU controller 200 utilizing the data line shown. The voltage sense circuit 98 does not interrupt the power lines as may be incorrectly implied in the drawings. Instead, the voltage sense circuit is connected across the lines between transformer 74 and contactor K1.

A contactor K1 is controlled by LPU controller 200 via a control line as shown in FIG. 4 and provides a switchable connection between transformer 75 and the utility grid 99. A neutral line may be tapped from transformer 74 as further shown in FIG. 2 and connected to the grid 99.

A separate start inverter 80 is connected to the DC bus 61 and the external DC voltage supply which may be constructed with a battery. The start inverter 80 is also connected to the permanent magnet generator 15.

A precharge circuit 78 is connected to the grid via transformer 76 and transformer 82. Precharge circuit 78 is further connected to the DC bus 61. The precharge circuit 78 has a control input connected to a control data line that terminates at the LPU controller 200 as shown.

The line power unit 100 also supplies power to a local grid (e.g., 240 VAC three phase supplying auxiliary of local loads) via transformer 74. This local grid feeds local loads and the turbine unit including pumps and fans in the turbine unit.

An auxiliary transformer 77 is also connected to the output of the transformer 74. The output of the auxiliary transformer 77 is fed to full wave rectifier 83 to supply full wave rectified power to the control power supply 84. The control power supply 84 supplies power to the engine control unit 12 and the LPU controller 200 as well as the I/O controller 310.

The I/O controller 310 is connected via data lines to the LPU controller 200. The I/O controller 310 is further connected to the engine control unit 12, display unit 250, and LPU external interface 320. The LPU external interface 320 has a connection for communication and control via port 321.

The LPU controller 200 has control lines connected to the start inverter 80, main inverter 70, precharge circuit 78, transformer 82, and contactor K1. Furthermore, data is also provided to the LPU controller 200 from control/data lines from these same elements as well as the phase and sequence detector 97 that is connected at the output of contactor K1. The LPU controller 200 also communicates data and control signals to the engine control unit 12.

The engine control unit is supplied power from the control power supply 84 and communicates with engine sensors as shown.

State Machine Mode Control

Figure 5A:
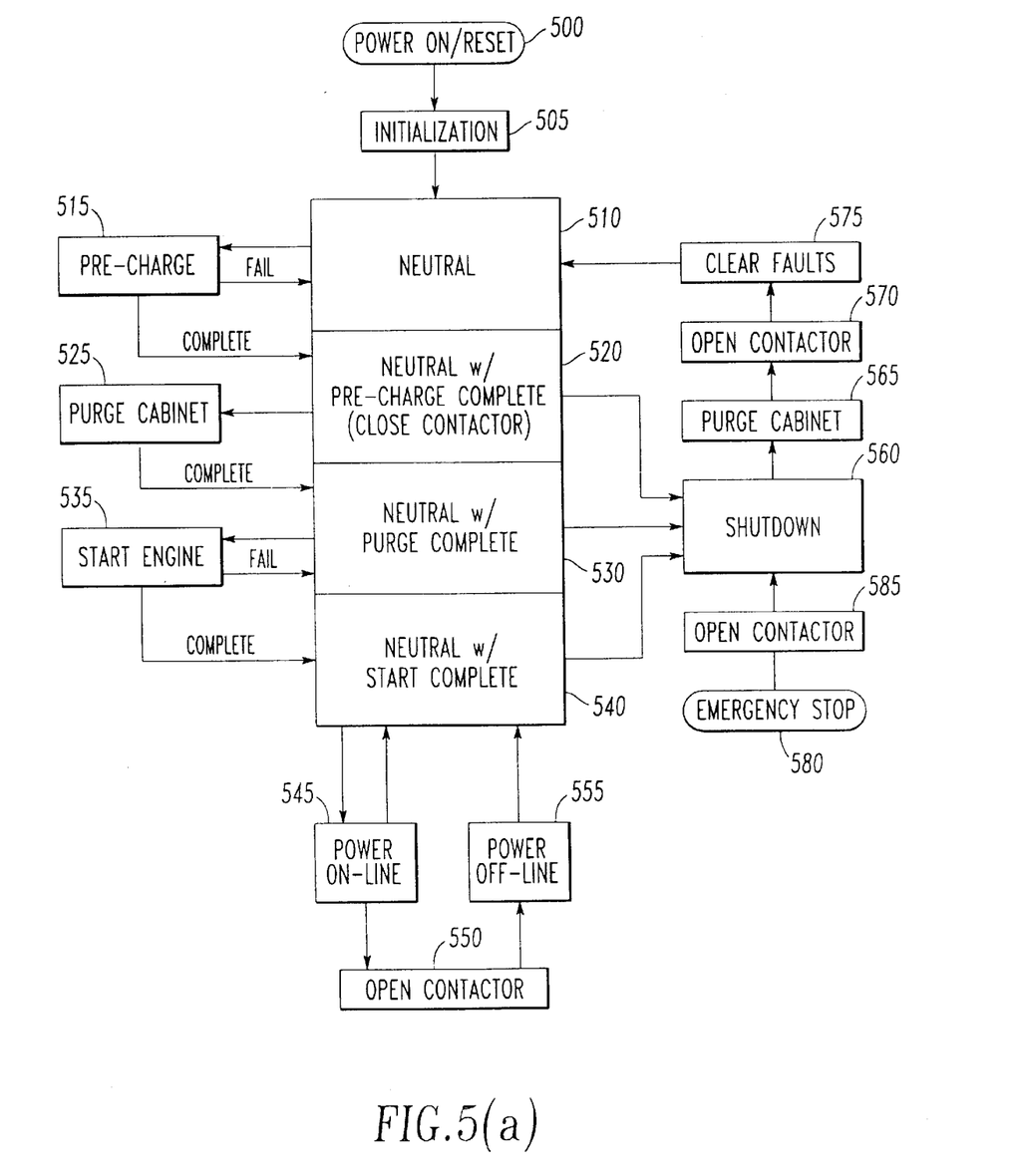
FIG. 5(a) is a state diagram according to a first embodiment of the invention that illustrates the control states and permitted control state transitions according to the invention.

FIG. 5(a) is a state diagram showing the control states and permitted control state transitions. The state diagram shown in FIG. 5(a) describes a state machine that may be implemented with the LPU controller 200 to control the line power unit 100 with the defined states and control state transitions. This state machine provides mode control for the following modes of operation: initialization, neutral, pre-charge, turbine start, power on-line, power off-line, and shut down.

The state diagram shown in FIG. 5(a) assumes that the line power unit 100 is mounted in an equipment cabinet having cooling fans and pumps circulating cooling fluid through cold plates. A cold plate is merely a device that includes a plenum through which cooling fluid is circulated and to which various power conversion devices such as the main inverter 70 and start inverter 80 are mounted. The cold plate acts as a heat sink for these devices and thereby prevents overheating. The alternative shown in FIG. 5(b) assumes that no such cabinet or cooling system is present and represents a simplified control state diagram for the invention.

Before describing the state transitions, a description of each control state will first be provided.

The power on/reset condition 500 is not really a control state but, rather, an initial condition that triggers the state machine. This initial condition includes power on of the line power unit 100 or reset of the line power unit 100.

The initialization state 505 occurs after reset or power on and initializes global variables, initializes the serial communication ports including the I/O controller 310 and LPU external interface 320 having serial ports contained therein, executes a built-in-test (BIT), and initializes the real-time interrupt facility and input capture interrupt within the LPU controller 200.

The initialization state also starts the line synchronization techniques of the invention which are further described below as well as starting the power factor control method of the invention.

The neutral state 510 monitors commands from the I/O controller 310 and engine control unit 12 to determine the next mode of operation as well as checking critical system parameters.

The pre-charge state 515 enables the pre-charge unit 78 to charge the DC link as well as checking on the rate of charging to determine correct hardware function. The pre-charge state 515 also performs diagnostic checks of the main inverter 70 to identify open or short type failures.

The neutral with pre-charge complete state 520 closes contactor K1 and performs diagnostic tests of the line power unit 100.

The purge cabinet state 525 purges the equipment cabinet in which the line power unit 100 is mounted including turning on any cooling fans and pumps and thereby bring the line power unit 100 into a purged and ready state.

The neutral with purge complete state 530 is an idle state that waits for an engine start command from the operator that is routed via port 321 to LPU external interface 320 to I/O controller 310 and thereby to LPU controller 200.

The start engine state 535 generally performs the function of starting the engine that drives the permanent magnet generator 15.

The start engine state 535 resets the start inverter 80 and performs basic diagnostic checks of the line power unit 100. The start engine state 535 also verifies the DC link voltage and thereafter sets the pulse width modulated control signal supplied to the start inverter 80 to control the maximum speed that the start inverter 80 will drive the permanent magnet generator 15 as a motor to thereby permit the engine to start.

More particularly, the start engine state enables the start inverter 80, receives updated speed commands from the engine control unit 12, monitors fault signals from the start inverter 80, and checks the speed of the engine and DC current drawn from the start inverter 80 to determine a successful start.

Actual starting of the engine is under the control of the engine control unit 12 which feeds fuel and any necessary ignition signals to the engine that is being spun by the permanent magnet generator 15. The start engine state 535 then waits for a signal from the engine control unit 12 to terminate the start operation which involves sending a stop signal to the start inverter 80.

Further details of engine starting can be found in related application Attorney Docket #1215-380P which is hereby incorporated by reference.

The neutral with start complete state 540 is an idle state wherein the engine is started and the permanent magnet generator 15 is being driven by the engine thereby producing three-phase power that is rectified by PMG rectifier 60 to supply DC bus 61 with DC power. The neutral with start complete state essentially waits for a power level command from the operator that is routed via port 321, LPU external interface 320, I/O controller 310 to the LPU controller 200.

The power on-line state 545 enables the main inverter 70 in a current mode and sends pulse width modulated control signals to the main inverter 70 to output three-phase electrical power having the commanded power level. The power on-line state also performs various system checks to maintain safe operation such as verifying the DC link voltage and cold plate temperatures.

The open contactor state 550 opens the main contactor K1.

The power off-line state 555 switches the main inverter 70 to a voltage mode and sets the power level command to a nominal level to power the local loads. The power off-line state may perform various system checks to maintain safe operation.

The shut down state 560 disables the main inverter 70 and reinitializes global variables that are utilized by the state machine to control the line power unit 100.

The purge cabinet state 565 performs essentially the same functions as the purge cabinet state 525 and ensures that the equipment cabinet housing the line power unit 100 cools down.

The open contactor state 570 waits for a nominal cool down period such as 5 minutes as well as controlling the contactor K1 such that it breaks the connection with the grid 99 thereby ensuring disconnection from the grid 99.

The clear faults state 575 clears any fault codes that may have triggered the shutdown.

The emergency stop indication 580 is not actually a control state, but instead illustrates the receipt of an emergency stop signal. The equipment cabinet housing the line power unit 100 preferably includes an emergency stop button that a user may trigger to shut down the system in an emergency.

The open contactor state 585 is triggered by the receipt of an emergency stop signal and opens main contactor K1 thereby breaking the connection to the grid 99.

The state transitions are represented in the drawings with arrows. These arrows convey important information. For example an unidirectional arrow such as → indicates a one-direction only permissible state transition. A bi-directional arrow, on the other hand, such as ←→ indicates bi-directional permissible state transitions. This may also be expressed by using the following bi-directional and unidirectional permissible state transition symbologies: (1) neutral state ←→ pre-charge state and (2) power on-line state → power off-line state.

The operation of the state machine illustrated in 5(a) will now be described.

After receiving the power on or reset signal 500, the initialization state 505 is triggered. After completion of the initialization procedures and successful built-in tests, the state machine permits the transition to neutral state 510.

The neutral state 510 monitors commands from the operator and engine control unit 12. Upon receiving an appropriate command, the state machine permits the transition to the pre-charge state 515 from the neutral state 510.

As described above, the pre-charge state 515 triggers the pre-charge unit 78 to pre-charge the DC bus 61 to a desired pre-charge voltage. The pre-charge state 515 determines successful pre-charge by monitoring the pre-charge rate and determining whether the pre-charge voltage is within acceptable limits at the end of the pre-charge cycle.

If the pre-charge state 515 determines that the pre-charge cycle is not successful, then the state machine transitions back to the neutral state 510 as indicated by the fail path illustrated on FIG. 5(a). Upon successful completion of the pre-charge cycle, however, the state machine permits the transition from the pre-charge state 515 to the neutral with pre-charge complete state 520.

The neutral with pre-charge complete state 520 closes the main contactor K1 thereby connecting the line power unit 100 to the grid 99. Thereafter, the state machine permits the transition to the purge cabinet state 525.

Upon successful purging of the cabinet and passing of any diagnostic tests such as checking the cold plate temperatures, the state machine permits the transition from the purge cabinet state 525 to the neutral with purge complete state 530. Upon receipt of a start engine command, the state machine permits the transition to the start engine state 535.

As described above, the start engine state 535 control the start inverter 80 to drive the permanent magnet generator 15 as a motor to spin the engine at a speed to permit the engine to be started. If the engine fails to start, then the state machine transitions to the neutral with purge complete state 530. If the engine successfully starts, then the state machine transitions to the neutral with start complete state 540 which waits for the receipt of a power level command from the operator or a remote host.

Upon receipt of a non-zero power level command, the state machine transitions from the neutral with start complete state 540 to the power on-line state 545.

If there is a utility outage, then the state machine transitions to the open contactor state 550 as further described in the utility outage ride-through section below.

On the other hand, receipt of a zero power level command transitions the state machine from the power on-line state to the neutral with start complete state 540.

After the open contactor state 550 completes the operation of opening contactor K1, the power off-line state 555 is entered. Upon completion of the power off-line procedures in power off-line state 555, the state machine transitions to the neutral with start complete state 540. If a shutdown command is received, the state machine then transitions to the shutdown state 560. The shutdown state 560 is followed by the purge cabinet state 565, open contactor state 570 and clear faults state 575 and then the neutral state 510 thereby bringing the line power unit 100 into a neutral state.

Upon receipt of an emergency stop signal 580, the open contactor state 585 is triggered. Thereafter, the shutdown state 560 is entered by the state machine and then the purge cabinet state 565, open contactor state 570, clear faults state 575 and neutral state 510 are sequentially entered by the state machine.

Figure 5B:
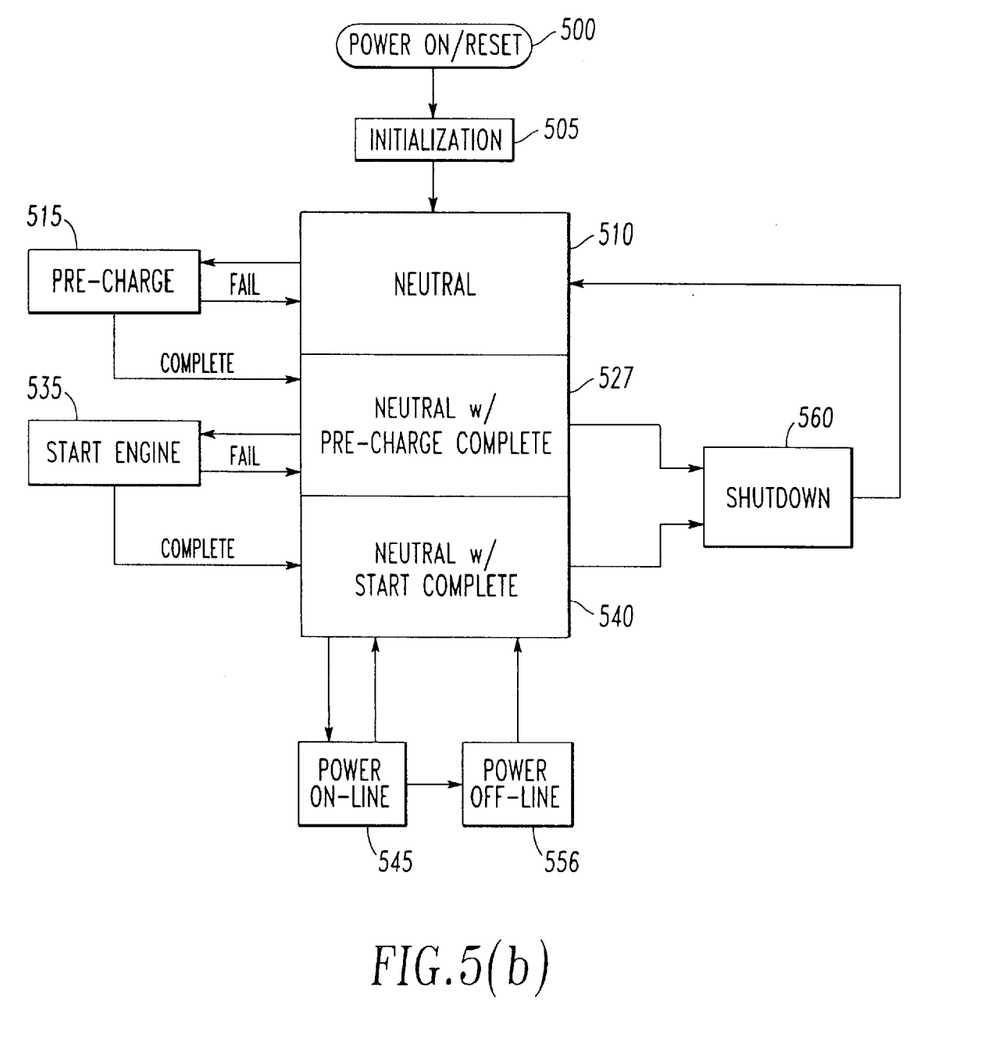
FIG. 5(b) is another state diagram illustrating a second embodiment according to the invention showing the control states and permitted control state transitions according to the invention.

FIG. 5(b) is a simplified state diagram that simplifies the states and state transitions illustrated in FIG. 5(a). FIG. 5(b) generally assumes that there is no cabinet that needs to be purged. The state machine in FIG. 5(b) also consolidates some of the states illustrated in FIG. 5(a). States having the same reference numerals are identical to those shown in FIG. 5(a). The differences are pointed out below.

The neutral with pre-charge complete state 527 shown in FIG. 5(b) differs from the neutral width pre-charge complete state 520 shown in FIG. 5(a) essentially because the purged cabinet state 525 has been eliminated in FIG. 5(b). The neutral with pre-charge complete state 527 closes the main contactor K1 and awaits for receipt of a start engine command from an operator or other device such as a remote host.

Further details of such remote host that may be utilized with this invention are provided by related application Ser. No. 09/140,392, presently U.S. Pat. No. 6,055,163, the contents of which are hereby incorporated by reference.

The power off-line state 556 shown in FIG. 5(b) also differs from the power off-line state 555 shown in FIG. 5(a). Essentially, the power off-line state 556 combines the open contactor state 550 with the power off-line state 555 shown in FIG. 5(a). Thus, the power off-line state 556 performs the functions of opening the contactor K1, switching the main inverter 70 to a voltage mode and setting the power level to a nominal level to power the local loads. Furthermore, various system checks may be performed to maintain safe operation.

The operation of the state machine shown in FIG. 5(b) is essentially the same as that shown in FIG. 5(a) with differences noted below.

The main difference is the consolidation of the neutral with pre-charge complete state 520 and the neutral with purge complete state 530 and the elimination of the purged cabinet state 525 from FIG. 5(a). Thus, when the pre-charge state 515 successfully completes the pre-charge cycle, the neutral with pre-charge state 527 is entered by the state machine.

Upon receipt of an engine start command, the start engine state 535 is entered by the state machine. Furthermore, upon a utility outage, the state machine transitions directly from the power on-line state 545 to the power off-line state 556 as shown in FIG. 5(b).

By utilizing the state machines of either FIGS. 5(a) or 5(b), the invention provides a real-time control method for controlling the line power unit 100. This real-time control unit includes specifically defined control states that ensure correct and safe operation of the line power unit 100. Furthermore, various system checks and diagnostics are performed throughout which further ensure safe operation and which further affect state transitions.

Line Synchronization

Figure 6A:
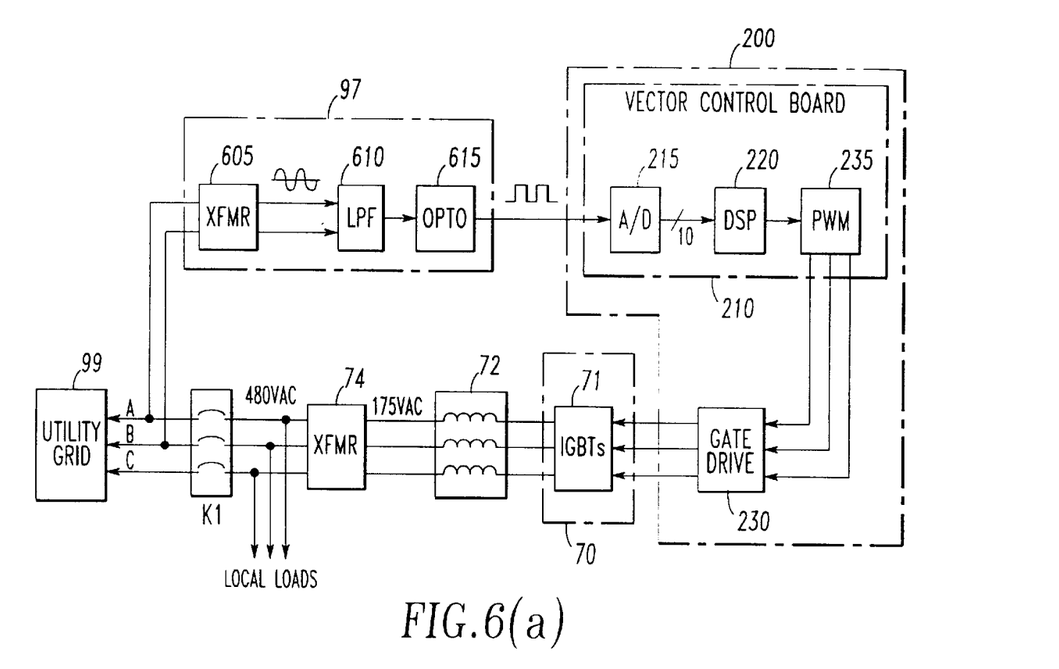
FIG. 6(a) is a block diagram illustrating a line synchronization apparatus according to the invention.
Figure 6B:
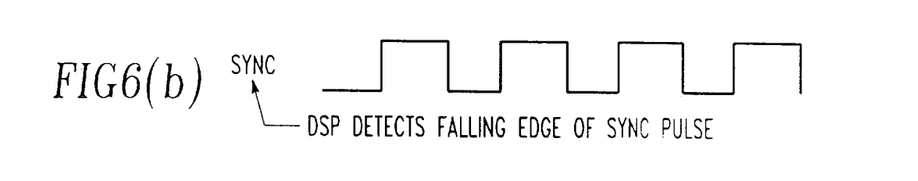
FIGS. 6(b)–(d) illustrate synchronization and phase-shift angles in a coordinated diagram showing relative positions and transitions of the signals according to the invention.

FIG. 6(a) illustrates the frequency sensing component of the frequency synthesizing apparatus and method according to the invention in relation to other components of the line power unit 100 and the utility grid 99.

The phase and sequence detecting circuit 97 shown in FIG. 4 may have the construction shown in FIG. 6(a). More particularly, the sequence detector includes a transformer 605 connected to two phases A, B of the utility grid 99. In this way, transformer 605 inputs the voltage and frequency of the utility grid 99.

This sensed voltage from transformer 605 is supplied to a low pass filter 610 and then to an optical isolator 615. The output of the optical isolator 615 is a uni-polar square wave as shown in FIG. 6(a) that is supplied to the line power unit controller 200. Specifically, the line power unit controller includes a vector control board 210 having an A/D converter 215 that accepts the uni-polar square wave from the optical isolator 615.

The A/D converter preferably converts this uni-polar square wave into a 10-byte digital signal that is fed to the digital signal processor (DSP) 220. The output of the DSP 220 is fed to a pulse width modulation (PWM) signal generation device 225.

The pulse width modulation signals from PWM 225 are fed to gate drive circuit 230 which drives the IGBT switches 71 located within the main inverter 70. The main inverter 70 is fed a DC voltage from DC bus 61 as shown in FIG. 4. For simplicity, this connection is not shown in FIG. 6(*a*). 9

The output of the main inverter 70 is filtered by inductor 72. Then, the voltage is stepped up by transformer 74 and supplied to the utility grid via contactor K1. The output of the transformer 74 also supplies local loads as shown in FIG. 6*a*.

The frequency synchronization apparatus shown in FIG. 6(*a*) operates in the following general manner. The output of the optical isolator 615 is a uni-polar square wave with a voltage swing preferably within the limits of the A/D converter 215. The DSP 220 controls the A/D converter 215 by initiating the conversion and reading of the digital value at a fixed frequency. This fixed frequency establishes the time base for which the inventive methods can compute the actual frequency of the signal and thereby the actual frequency of the utility grid 99. This is accomplished by determining when the falling edge of the signal occurred and counting the number of samples between successive falling edges.

Alternatively, the invention could utilize the rising edge of the signal, but for simplicity this explanation will focus on the falling edge implementation.

FIGS. 6(*b*)–(*d*) illustrate various signals utilized by the invention to perform synchronization. FIG. 6(*b*) illustrates the SYNC signal that is the fixed frequency signal utilized by the DSP 220 to control the initiation and reading of the data from the A/D converter 215. FIG. 6(*c*) illustrates the THETA signal which is a variable in software that is utilized to represent the angle of the utility sine wave and ranges from 0° to 360° in a series of stepped ramps each of which runs from 0° at the falling edge of the SYNC pulse to 360° at the next falling edge of the SYNC pulse. FIG. 6(*d*) illustrates THETA~ which is the phase shift added to THETA for power factor control as further described below.

Figure 7A:
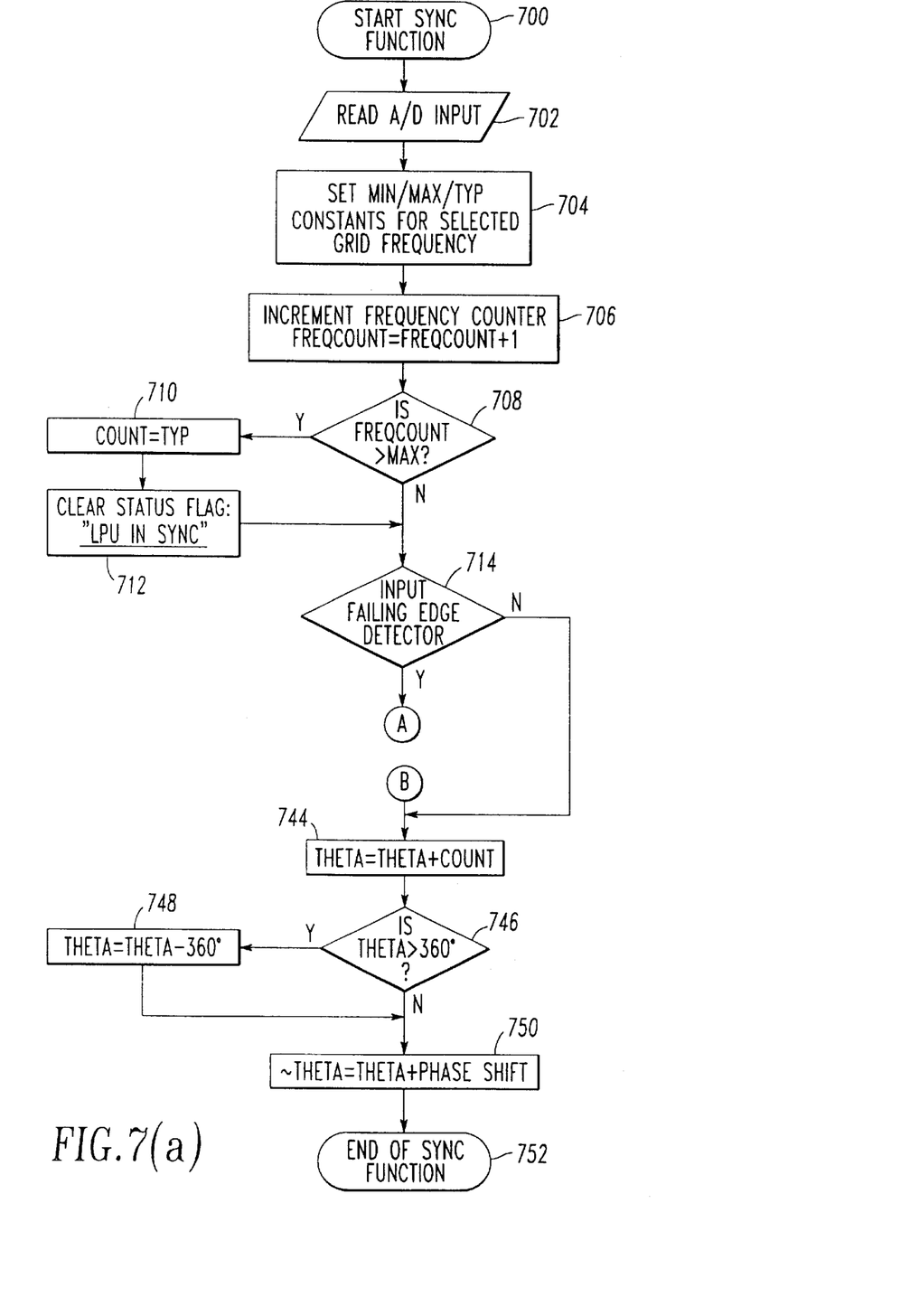
FIGS. 7(a)–(b) are flow charts illustrating the line synchronization method according to the invention.
Figure 7B:
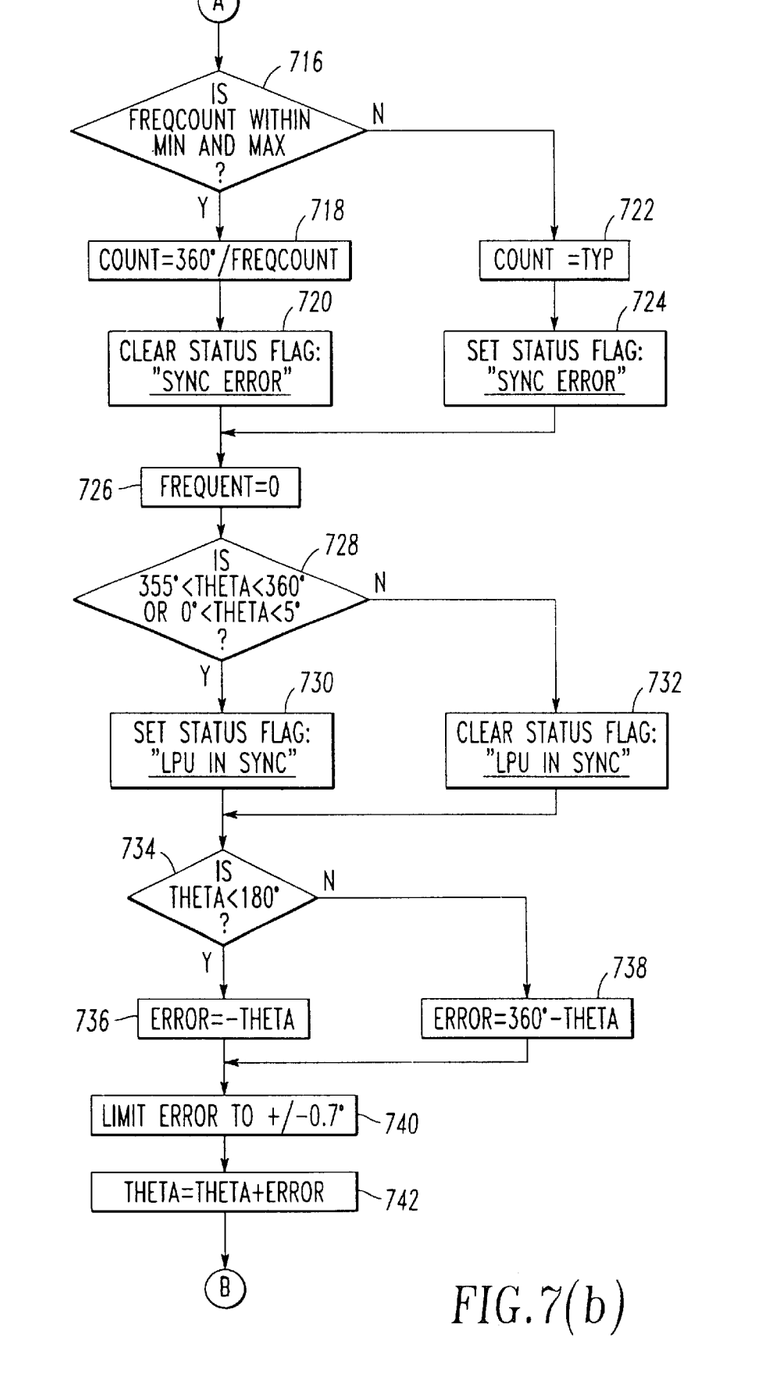

The synchronization method is further illustrated in FIG. 7(*a*)–(*b*). As shown in FIG. 7(*a*), the synchronization function is started or called every 64 microseconds at which time step 702 causes the digital signal processor 220 to read the A/D 215 input. As further illustrated in FIG. 7(*a*), the input signal is a square wave at the frequency of the grid.

Then, step 704 sets the minimum, maximum and typical constants which are set according to the selected grid frequency. The grid frequency is chosen between either 50 or 60 hertz which thereby effects the values for the minimum, maximum and typical constants in step 704.

Thereafter, step 706 increments the frequency counter which is represented as FreqCount=FreqCount+1. The variable FreqCount is the number of times this routine is called between falling edges of the input signal.

After step 706, then step 708 checks whether the FreqCount variable is out of range. If so, the Count variable is set to a typical value in step 710 and the step 712 then clears the status flag that would otherwise indicate that the line power unit 100 is in synchronization with the grid 99. In other words, step 712 clears this status flag thereby indicating that the line power unit is not in synchronization with the grid 99.

After step 712 or if decision step 708 determines that the FreqCount is not out of range, then step 714 then determines whether there is an input from the falling edge detector. Step 714 determines whether the falling edge of the synchronization pulse has occurred. If yes, then the flow proceeds to jump point A which is further illustrated in FIG. 7(*b*).

Step 708 essentially determines whether the grid 99 is present or whether there is a utility outage. If there is utility outage, then the FreqCount variable will exceed the maximum thereby causing the system to set the count value to a typical value in step 710.

FIG. 7(*b*) continues the frequency synchronization process beginning with a determination of whether the frequency of the incoming signal, input is within the correct range. Particularly, step 716 determines whether the FreqCount variable is within the minimum and maximum values. If not, then step 722 sets the count variable to a typical value and then step 724 sets a status flag indicating synchronization error.

On the other hand, if the FreqCount variable is within the correct range as determined by step 716, then step 718 sets the Count variable equal to 360°/FreqCount. Then step 720 clears the status flag indicating no synchronization error.

After either steps 720 or 724, the method executes step 726 which resets the FreqCount variable to 0.

Thereafter, the method then determines whether THETA is in synchronization with the incoming signal input. THETA should equal 0 at the same time the falling edge of the input signal is detected if synchronization has occurred. This is determined by step 728 which checks whether THETA is substantially equal to 360° or 0°. If not, the status flag is cleared by step 732 indicating that the line power unit is not in synchronization. If yes, then step 730 sets the status flag indicating that the LPU 100 is in synchronization with grid 99.

After setting the status flags in step 730 or step 732 then the process adjusts THETA to maintain or achieve synchronization with the input signal. Particularly, step 734 first determines if THETA is less than 180°. If yes, then the error variable is set to minus THETA. If not, then step 738 sets the error variable equal to 360°−THETA.

After setting the error variable in step 736 or step 738, then the method proceeds to limit the rate of change of the Error variable. The preferred embodiment shown in FIG. 7*b* limits the Error variable to +/−0.7° in step 740. Thereafter, step 742 sets the THETA variable equal to THETA plus the Error variable.

After step 742, the flow returns via jump point B to the flow shown in FIG. 7(*a*) beginning with step 744.

Figure 6C:
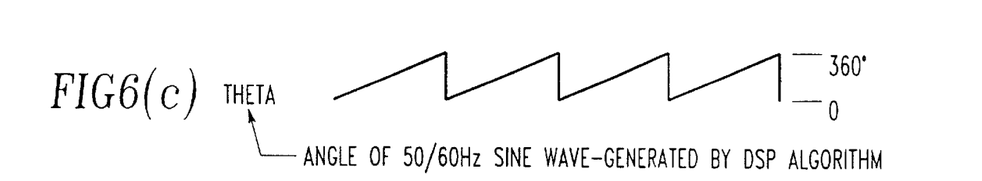
Figure 6D:
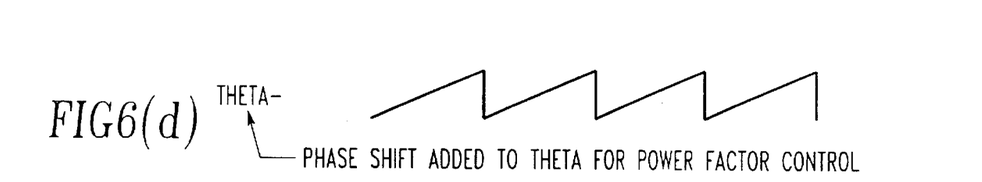

As further shown in FIG. 7(*a*), the process proceeds after jump point B by generating THETA by incrementing THETA by the count variable every 64 microseconds. This process generates the THETA signal shown in FIG. 6(*c*). More particularly, step 744 sets THETA=THETA+Count thereby incrementing THETA.

After step 744, decision step 746 determines whether THETA is greater than 360°. If yes, step 748 resets THETA to THETA minus 360° to bring THETA within range.

If not, then step 750 determines the phase shift variable THETA~ by setting THETA~ equal to THETA plus any desired phase shift.

THETA~ is an optional variable as is step 750. This optional step 750 permits an operator to adjust the power factor of the three phase power delivered to the grid 99 by utilizing the phase shift variable. In essence, the operator merely needs to input data to set the phase shift variable to thereby adjust the power factor. Step 750 can then adjust the power factor by setting THETA~=THETA+phase shift.

After step 750, the synchronization function has completed its operations as indicated by end of SYNC function step 752. This routine is again called after 64 microseconds have elapsed since the initiation of the SYNC function in step 700.

The inventive methodology illustrated in FIGS. 7(*a*) and 7(*b*) outputs a THETA~ that is utilized by a known vector algorithm in the vector board 210 to generate pulse width modulation signals from PWM 225 that are fed to gate drive 230 to thereby control the main inverter 70. Such pulse width modulation control of the power can then shift the phase of the power output from main inverter 70 and thereby bring the output power into synchronization with the utility grid 99.

Instead of sampling the grid frequency, circuit 97 may also synthesize a grid frequency. This is necessary when the line power unit 100 is operating in a stand-alone mode or when the utility grid 99 is not available. Thus, the system must synthesize a frequency when the grid is temporarily disconnected so that the output power frequency is self-regulating.

One of the advantages of the inventive line synchronization technique is that it limits the resynchronization rate in step 740. By limiting the resynchronization rate, the invention provides a smooth transition from out-of-SYNC line power unit 100 to an in-SYNC line power unit 100 that is in synchronization with the utility grid 99. This reduces transient voltages, stress on the components and increases safety.

As further described above, this line synchronization technique also permits power factor control such that an operator or remote host can input a phase shift data via port 321 and thereby control the power factor of power supplied to the grid 99.

Utility Outage Ride-through

The state machines described in FIGS. 5(*a*)–(*b*) include states that are involved in the utility outage ride-through methodology. Specifically, the neutral with start complete state 540, power on-line state 545, open contactor state 550, and power off-line state 555 shown in FIG. 5(*a*) are the control states involved in the utility outage ride-through methodology.

Alternatively, the neutral with start complete state 540, power on-line state 545 and power off-line state 556 shown in FIG. 5*b* are alternative control states that may also be utilized by the utility outage ride-through methodology of this invention.

The utility outage ride-through methodology may be implemented within a controller such as the controller 200 shown in FIG. 3 or the LPU controller 200 shown in FIG. 4.

Figure 8:
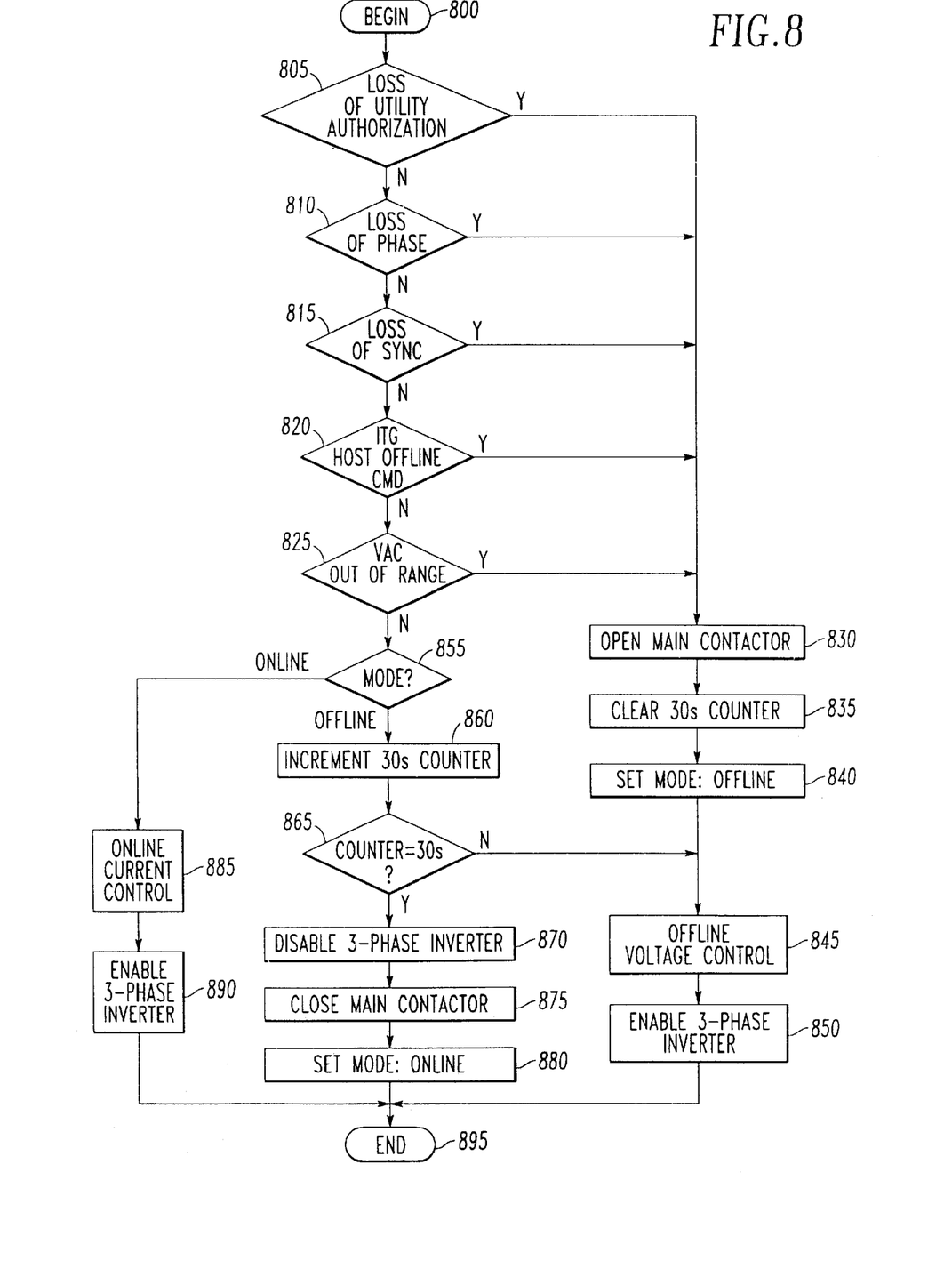
FIG. 8 is a flow chart illustrating the utility outage ride-through method according to the invention.

The utility outage ride-through method that may be programmed into the LPU controller 200 is shown in FIG. 8. Furthermore, the utility outage ride-through methodology shown in FIG. 8 may be utilized by the state machine shown in FIGS. 5*a*–*b* to control the state transitions mentioned above.

The utility outage ride-through method shown in FIG. 8 begins with step 800. Then, steps 805, 810, 815, 820, 825 determine the existence of a fault condition. Upon the occurrence of any of these fault conditions, then the flow proceeds to open main contactor step 830.

More particularly, step 805 determines whether there is a loss of utility authorization. In general, most electric utilities send authorization data to each electrical power generator supplying power to the grid 99. In this way, the utility can either authorize or cancel authorization for connection to the grid 99. Step 805 determines whether the utility authorization has been cancelled.

Step 810 determines whether there is a loss of phase. This may be performed by sampling the input from the phase and sequence detector 97. If any of the phases have been lost, then step 810 directs the flow to open main contactor step 830.

Similarly, loss of synchronization step 810 determines whether there is a loss of synchronization between the line power unit 100 and the grid 99. This loss of synchronization may be determined from the status flag "LPU in SYNC" set by the synchronization method described above in relation to FIGS. 7(*a*)–(*b*).

Step 820 decides whether the industrial turbo generator (ITG) host has sent an off-line command via port 321 to the LPU controller. It is not essential that an ITG host be utilized, and this step 820 may be simplified to receive any off-line command by LPU controller 200.

Step 825 determines whether the AC voltage of the grid 99 is out of range. The voltage sense circuit 98 senses this AC grid 99 voltage and sends a signal to the LPU controller 200 which can thereby determine whether the VAC is out of range in step 825.

If any fault condition has occurred, then step 830 is executed which opens the main contactor K1 and disconnects the line power unit 100 from the grid 99.

Thereafter, step 835 resets or clears a time counter which is preferably a 30 second time counter.

Then, step 840 sets the operational mode to offline which causes the state machine of FIG. 5(*a*) to transition from the open contactor state 550 to the power off-line state 555. The power on-line state 545 to open contactor state 550 transition occurs in step 830 and is triggered by any of the fault conditions described above.

Thereafter, off-line voltage control is initiated by step 845 wherein the main inverter 70 is controlled by LPU controller 200 in a voltage control mode for stand-alone operation and feeding of the local loads.

After setting the off-line voltage control in step 845, step 850 enables the main inverter 70 to thereby supply power to the local loads. This ends the flow as indicated by step 895.

The system then continues checking the occurrence of fault conditions as described above. Continued fault conditions have the effect of clearing the 30 second counter each time.

When all of the faults have been cleared, then the flow proceeds to step 855 which determines whether the on-line or off-line mode (state) is being utilized by the line power unit 100. Continuing with this example, the off-line mode is now utilized by the state machine. Thus, the mode determination step 855 directs the flow to step 860 which begins incrementing the 30 second counter.

If the counter has not yet reached the 30 second time limit, then step 865 directs the flow to off-line voltage control setting step 845 and enable three phase inverter step 850 the effect of which is to return or loop back to the increment 30 second counter step 860.

This loop continues until the 30 second counter has elapsed as determined by step 865. Thereafter, step 870 disables the main inverter 70. After disabling the main inverter 70, step 875 closes main contactor K1 thereby connecting the line power unit 100 to the grid 99. Then, the mode is set to the online mode which transitions the state machine from the neutral with start complete state 540 to the power on-line state 545. This also causes the next loop to take the left branch as determined by the mode determination step 855 which will now sense the online mode.

If the mode is on-line, the flow proceeds from step 855 to on-line current control step 885 which controls the main inverter 70 in a current control mode. Thereafter, step 890 enables the inverter 70 to thereby supply power to the grid 99 via closed contactor K1. The process is then completed as indicated by end step 895.

By utilizing the utility outage ride-through methodology above, the invention has the capability of detecting a utility outage or other fault condition thereby triggering disconnection from the grid. The invention also provides a smooth transition from a current mode (utility connected) to a voltage mode (utility outage) for the main inverter 70.

The benefit is more stability and faster response to wide swings in generator voltage. The invention also has the feature of over-current limiting which is a self-protection function which prevents voltage brown-out at excessive current levels. This method also easily transitions from voltage mode to current mode when reconnecting to the grid thereby minimizing transients on power output to the grid 99.

When the line power unit 100 disconnects from the grid 99, a typical system will vary greatly in speed and output voltage as it is rapidly unloaded. To prevent such large voltage swings from reaching the inverter 70 output, a feed forward technique is utilized as described above to control the inverter 70 output voltage.

Using such feed forward control, the generator voltage is sampled and used to establish the modulation index of the pulse-width modulated sinusoidal voltage produced by the inverter 70 keeping the sinusoidal output voltage nearly constant. This control technique provides the high level of stability and fast response needed for rapid changes of input voltage. Over-current protection is provided by reducing the modulation index when the maximum allowed output current is reached, producing a brown-out effect.

When the grid power is restored, the line power unit 100 voltage is first synchronized with the grid voltage. After synchronizing with the grid (as determined by step 815 and implemented by the synchronization techniques described above), normal current controlled power flow into the grid 99 can then resume.

Power Factor Control

The system may be further enhanced by providing an apparatus and method for controlling the power factor of power delivered to the grid 99. Although the synchronization control described above also provides power factor control, the invention also provides an alternative control loop that controls the power factor.

The power factor control device and methods according to the invention may be applied to a wide variety of grid-connected generation facilities as graphically illustrated by FIG. 2. The current controlled inverter 70 may be controlled with the device shown in FIG. 9.

Figure 9:
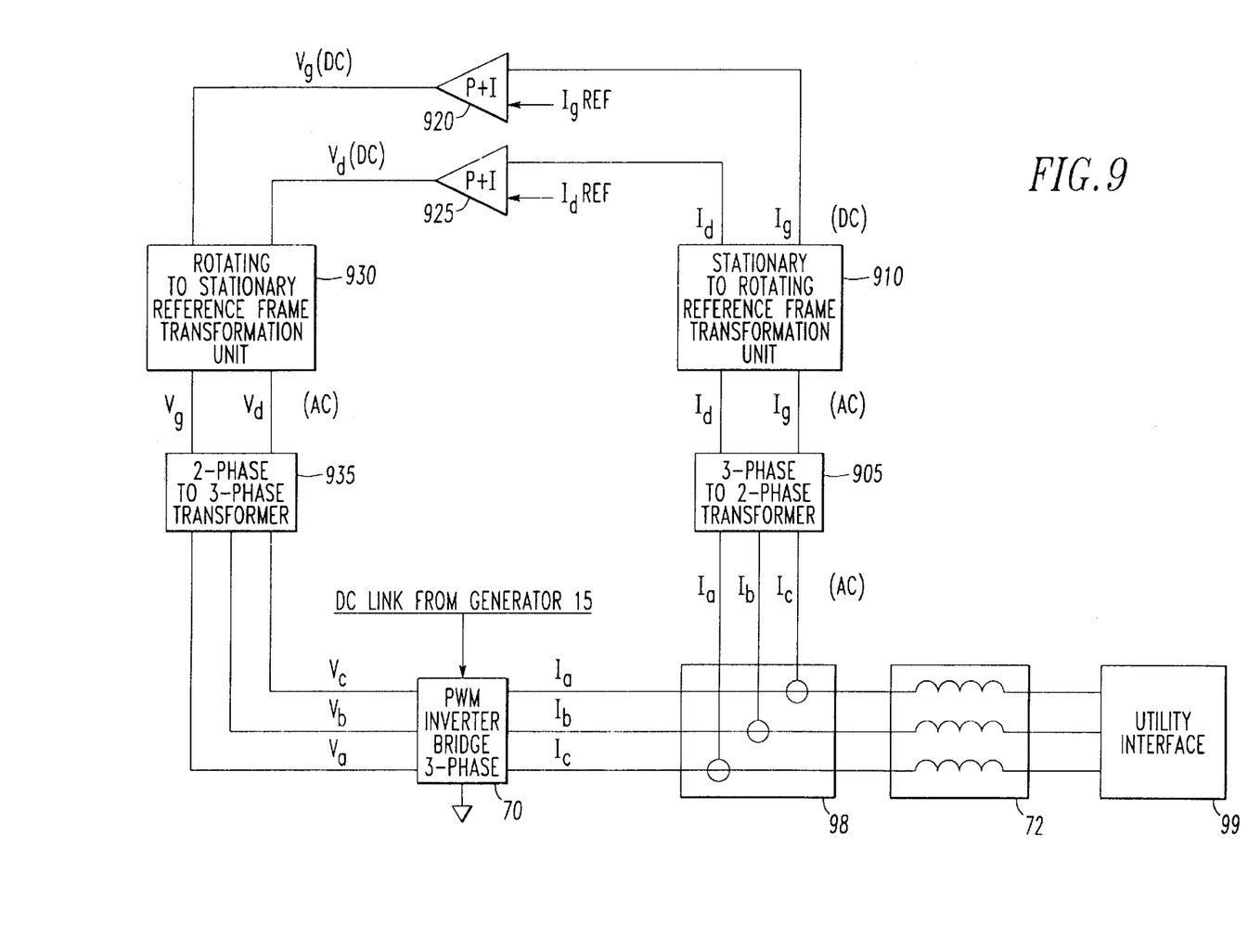
FIG. 9 is a control-loop block diagram illustrating the power factor control method according to the invention.

FIG. 9 illustrates a device for controlling power factor that interfaces with a current controlled inverter 70 as shown in FIG. 9 or, alternatively, the current controlled inverter 70 shown in FIG. 2 or 4.

This power factor control device includes a sensor 98 that senses the current supplied to the utility 99 from the inverter 70. All three phases ($I_a$, $I_b$, $I_c$) of the current supplied to the utility 99 are sensed by sensor 98 and supplied to three-phase to two-phase transformer 905 to output two-phase D-Q coordinate signals $I_d$, $I_q$.

The two-phase signals $I_d$, $I_q$ are then supplied to a stationary-to-rotating reference frame transformation unit 910 that changes the two-phase AC signals ($I_d$, $I_q$) from the stationary to a synchronously rotating reference frame which converts the signals from AC to DC.

The DC signals are then compared against reference signals $I_{q\ Ref}$, $I_{d\ Ref}$ by comparators 920 and 925, respectively. The comparators 920, 925 are preferably proportional-plus-integral gain stages that perform proportional-plus-integral comparison operations between the reference signals $I_{q\ Ref}$, $I_{d\ Ref}$ and the DC signals $I_d$, $I_q$.

The reference signals $I_{q\ Ref}$, $I_{d\ Ref}$ may be supplied by the LPU controller 200 which, in turn, may be supplied these reference signals from an operator via port 321, LPU external interface 320, I/O controller 310. In this way, either the LPU controller 200 or the operator can command the power factor.

Furthermore, the utility may also request a certain power factor to be supplied to the grid 99 by the line power unit 100. Such a request can be fed to the system via the reference signals $I_{q\ Ref}$, $I_{d\ Ref}$.

The proportional plus integral gain stages 920, 925 output voltage signals $V_q$, $V_d$ that are transformed back to a stationary reference frame by rotating to stationary reference frame transforming unit 930 to output AC voltages $V_q$, $V_d$. These AC voltages are then subjected to a two-phase to three-phase transform by unit 935 to thereby output three-phase voltages $V_a$, $V_b$, $V_c$ which are then sent to a pulse width modulator which controls the switches in a three-phase, full-wave IGBT bridge within the inverter 70 to produce AC currents ($I_a$, $I_b$, $I_c$) with a vector that contains the real and reactive components commanded by $I_{d\ Ref}$ and $I_{q\ Ref}$. This power factor control loop provides independent control of the real and reactive components of the current output to utility 99. This invention draws upon widely known vector control techniques developed for induction motor drives. The desired amplitudes of real and reactive current supplied to the utility 99 are commanded by $I_{q\ ref}$ and $I_{d\ ref}$, respectively. The control loop described above drives the output current to the utility ($I_a$, $I_b$, $I_c$) so that the magnitude and phase contain the commanded real and reactive current components.

This is often beneficial in improving the power factor in the utility distribution system 99. Furthermore, the utility interface 99 may also be a local grid. Such a local grid may also require power factor correction due to large inductive or capacitive loads on the local grid. The poor power factor that such large inductive or capacitive loads cause may be corrected by utilizing the power factor control method and apparatus disclosed herein.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of controlling a device having a full wave rectifier connected to a generator, a DC bus connected to the output of the full wave rectifier, an inverter connected to the DC bus, an inductor unit connected to the output of the inverter, and a first contactor unit selectively connecting and disconnecting the inductor unit to and from a grid, the method comprising the steps of:

commanding the inverter to perform online voltage control;

detecting a fault condition indicating a fault in the device or the grid opening the first contactor;

clearing a time counter;

setting a mode to an offline mode; and commanding the inverter to perform offline voltage control;

said opening, clearing, setting and commanding offline voltage control steps being performed when said detecting step detects the fault condition or continues to detect the fault condition.

2. The method according to claim 1, further comprising the steps of:

determining the mode when said detecting step detects no fault condition; and incrementing the time counter when said mode determining step determines that the mode is the offline mode.

3. The method according to claim 2, further comprising the steps of:

checking the time counter for expiration thereof;

disabling the inverter;

closing the contactor; and setting the mode to the online mode, wherein said disabling, closing and setting the online mode steps are performed when said checking step determines that the time counter has expired.

4. The method according to claim 3, further comprising the steps of:

determining the mode when said detecting step continues to detect no fault condition;

commanding the inverter to perform online current control; and enabling the inverter, said commanding online current control step and said enabling step being performed when said mode determination step determines that the mode is the online mode.

5. The method according to claim 4, further comprising the step of:

iterating the method.

6. The method according to claim 1, wherein the fault condition includes a fault in the device, loss of phase in the grid, loss of utility authorization, grid voltage out of range, or loss of synchronization between the device and the grid.

7. The method according to claim 1, inputting an offline command, wherein upon receipt of the offline command said detecting step detects the fault condition.

8. The method according to claim 1, wherein the predetermined time period is approximately 30 seconds.

* * * * *